A. G. J. RAPP.
GUARD FOR CONVEYER ROLLS.
APPLICATION FILED AUG. 24, 1912.
1,116,737.
Patented Nov. 10. 1914.
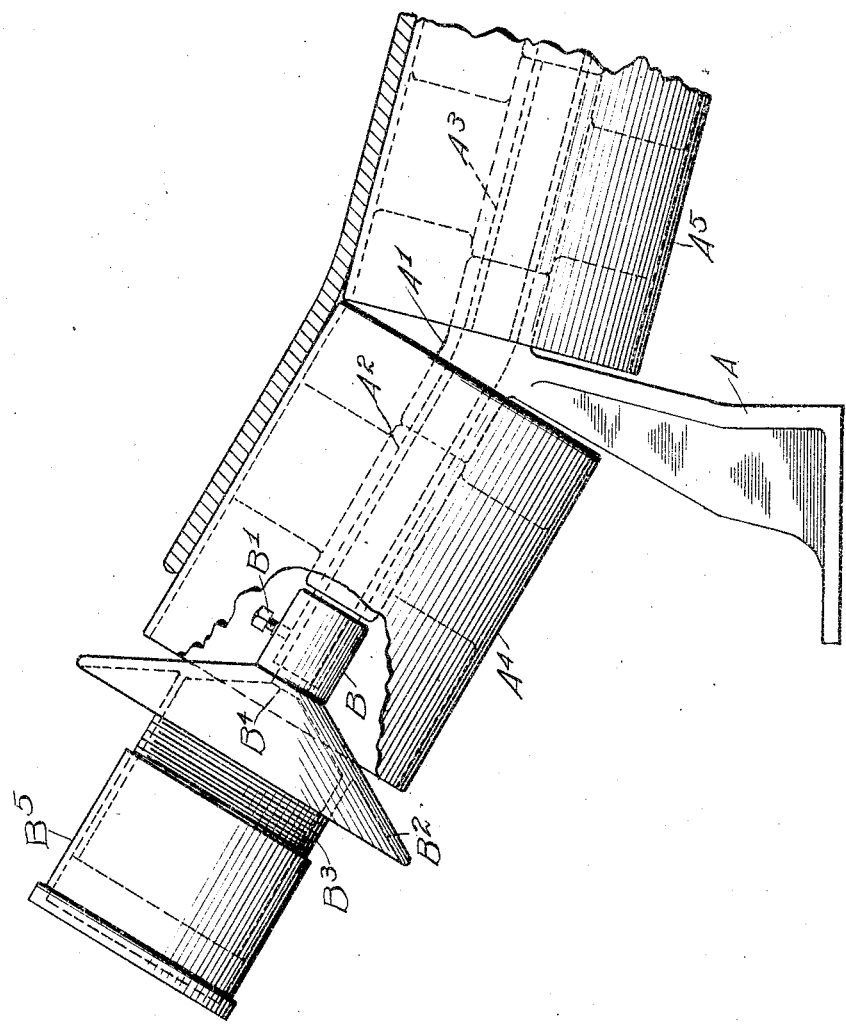

UNITED STATES PATENT OFFICE.

AXEL G. J. RAPP, OF CHICAGO, ILLINOIS, ASSIGNOR TO LINK-BELT COMPANY, OF CHICAGO, ILLINOIS, A CORPORATION OF ILLINOIS.

GUARD FOR CONVEYER-ROLLS.

1,116,737.

Specification of Letters Patent. Patented Nov. 10, 1914.

Application filed August 24, 1912. Serial No. 716,912.

*To all whom it may concern:*

Be it known that I, AXEL G. J. RAPP, a citizen of the United States, residing at Chicago, in the county of Cook and State of Illinois, have invented a certain new and useful Improvement in Guards for Conveyer-Rolls, of which the following is a specification.

My invention relates to guards for conveyer rolls, troughing rolls and the like, and has for one object to provide means to guard the hand of the operator against being caught between a roll and a cup.

It is illustrated diagrammatically in one form in the accompanying drawing, wherein the figure is an elevation, with parts broken away, of the preferred form of my device.

Like parts are indicated by the same letters in the drawing.

The stand A having the forked head $A^1$ carries the shafts $A^2$, $A^3$ upon which are rotatably mounted the rolls $A^4$, $A^5$. The shafts $A^2$, $A^3$ are hollow, and the forked head $A^1$ is also hollow. Passages lead from the interior of the shafts to the bearing surfaces on the exterior to lubricate the rolls.

The sleeve B is held upon the shaft $A^2$ by means of the set screw $B^1$ and carries on its outer end a conical flange $B^2$ from which projects outwardly the cylindrical grease cup $B^3$ communicating at its bottom through the port $B^4$ with the hollow interior of the shaft $A^2$. The cap $B^5$ is screw-threaded on the cylindrical cup $B^3$ to permit its being screwed downwardly to force the grease out of the cup through the hollow shafts to the bearing surfaces.

It will be observed that the flange from which the grease cup rises is arranged immediately adjacent the end of the roll and overlies the roll and thus prevents any possibility of the operator getting his hand caught against the roll or between it and the grease cup, as might otherwise be the case while manipulating the grease cup. The flange also when located as in the preferred form about the base of the cup, serves as a deflector or guard to prevent the entrance of any grease into the interior of the roll other than through the grease cup itself, thus preventing the gumming up of the interior of the roll by grease which may leak down through the threaded connection between the grease cup and the cap.

It will be evident that while I have shown in my drawing an operative device, still many changes might be made in the form, size, shape and arrangement of parts without departing materially from the spirit of my invention.

I claim:

The combination with a troughing conveyer roll of a separate shaft upon which said roll is mounted, a collar upon the end of said shaft, an outwardly flaring conical flange mounted on said collar and projecting therefrom whose apex is located within the end of the roll and whose base is located beyond the end of the roll and without the periphery thereof.

In testimony whereof, I affix my signature in the presence of two witnesses this 14th day of August, 1912.

AXEL G. J. RAPP.

Witnesses:
FRANCIS W. PARKER, Jr.,
LILLIAN G. ROSS.